United States Patent
Hasegawa

(10) Patent No.: US 12,225,428 B2
(45) Date of Patent: Feb. 11, 2025

(54) VEHICLE CONTROL DEVICE AND VEHICLE CONTROL METHOD

(71) Applicant: HONDA MOTOR CO., LTD., Tokyo (JP)

(72) Inventor: Satoshi Hasegawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 17/669,524

(22) Filed: Feb. 11, 2022

(65) Prior Publication Data

US 2022/0286809 A1     Sep. 8, 2022

(30) Foreign Application Priority Data

Mar. 8, 2021    (JP) .................................. 2021-036308

(51) Int. Cl.
| | |
|---|---|
| *H04W 4/02* | (2018.01) |
| *G07C 5/00* | (2006.01) |
| *H04B 17/318* | (2015.01) |
| *H04W 76/14* | (2018.01) |
| *H04W 76/15* | (2018.01) |
| *H04W 4/40* | (2018.01) |

(52) U.S. Cl.
CPC ............ *H04W 4/023* (2013.01); *G07C 5/008* (2013.01); *H04B 17/318* (2015.01); *H04W 4/025* (2013.01); *H04W 76/14* (2018.02); *H04W 76/15* (2018.02); *H04W 4/40* (2018.02)

(58) Field of Classification Search
None
See application file for complete search history.

(56) References Cited

U.S. PATENT DOCUMENTS

| | | | |
|---|---|---|---|
| 2014/0114504 A1* | 4/2014 | Yamashita | ................ G06F 7/00 701/2 |
| 2021/0105573 A1* | 4/2021 | Tokunaga | ............. H04W 4/029 |

FOREIGN PATENT DOCUMENTS

| | | |
|---|---|---|
| JP | 10-266934 | 10/1998 |
| JP | 2014-54902 | 3/2014 |

\* cited by examiner

*Primary Examiner* — Frantz Bataille
(74) *Attorney, Agent, or Firm* — Rankin, Hill & Clark LLP

(57) ABSTRACT

A vehicle control device including: a first terminal position recognition unit that recognizes a first position of a user terminal with respect to a vehicle by activating a first prescribed number of a plurality of second communication antennas and by performing second wireless communication between the vehicle and the user terminal; and a terminal distance recognition unit that: recognizes a distance between the vehicle and the user terminal by activating a second prescribed number, which is less than the first prescribed number, of the second communication antennas based on the first position and by performing the second wireless communication between the vehicle and the user terminal; and, thereafter, repeatedly executes terminal distance recognition processing for recognizing the distance between the vehicle and the user terminal by changing the number of the second communication antennas to be activated in accordance with the distance between the vehicle and the user terminal.

9 Claims, 6 Drawing Sheets

VEHICLE CONTROL DEVICE AND VEHICLE CONTROL METHOD

INCORPORATION BY REFERENCE

The present application claims priority under 35 U.S.C. § 119 to Japanese Patent Application No. 2021-036308 filed on Mar. 8, 2021. The content of the application is incorporated herein by reference in its entirety.

BACKGROUND OF THE INVENTION

Field of the Invention

The present invention relates to a vehicle control device and a vehicle control method.

Description of the Related Art

Conventionally, there has been proposed a vehicle control system that includes a security device and an in-vehicle reader/writer for enabling operations of a vehicle by mobile terminals such as a car key, a smartphone, and the like (see Japanese Patent Laid-Open No. 2014-54902, for example). As for the vehicle control system, the security device allows locking/unlocking of the door lock by the car key when the car key is successfully authenticated within a communication area outside the vehicle. Furthermore, the security device allows start of the engine by the car key when the car key is successfully authenticated within a communication area inside the vehicle.

Moreover, the in-vehicle reader/writer allows operations (locking/unlocking of the door lock, start of the engine, and the like) of the vehicle by a mobile terminal when the mobile terminal brought inside the vehicle is successfully authenticated therewith via NFC (Near Field Communication).

Furthermore, there has been disclosed a configuration for reducing the power consumption of a vehicle remote device, which receives wireless signals transmitted from a mobile transmission unit and unlocks the door lock of the vehicle, by intermittently supplying the power to a signal processing unit that receives the wireless signals and by switching the period of supplying the power in accordance with whether the door is locked and in accordance with the elapsed time after the door is locked (see Japanese Patent Laid-Open No. 10-266934, for example).

As described above, in a case where authentication of the user approaching the vehicle is performed by a user terminal such as a smartphone carried by the user, it is necessary to recognize the position of the user terminal with respect to the vehicle with high precision. It is also necessary to constantly monitor the approaching of the user terminal to the vehicle in order to prepare for the use of the vehicle by the user, so that it is desired to reduce the power consumption required for recognizing the position of the user terminal.

The present invention is designed in view of the foregoing circumstances, and it is an object thereof to provide a vehicle control device and a vehicle control method capable of reducing the power consumption required for recognizing the position of the user terminal approaching the vehicle.

SUMMARY OF THE INVENTION

As a first mode for achieving the foregoing object, there is a vehicle control device including: a first wireless communication establishment recognition unit configured to recognize that first wireless communication is established between a user terminal and a vehicle, the user terminal being used by a user of the vehicle and performing the first wireless communication by a first communication specification and second wireless communication by a second communication specification with the vehicle; a first terminal position recognition unit configured to recognize a first position of the user terminal with respect to the vehicle by activating, among a plurality of second communication antennas of the second communication specification provided to the vehicle, a first prescribed number of a plurality of the second communication antennas and by performing the second wireless communication between the vehicle and the user terminal, when the first wireless communication establishment recognition unit recognizes that the first wireless communication is established between the vehicle and the user terminal; a terminal distance recognition unit configured to: select a second prescribed number, which is less than the first prescribed number, of the second communication antennas based on the first position, activate the selected second communication antennas, and perform the second wireless communication between the vehicle and the user terminal to recognize a distance between the vehicle and the user terminal; and, thereafter, repeatedly execute terminal distance recognition processing for recognizing the distance between the vehicle and the user terminal by changing the number of the second communication antennas to be activated in accordance with the distance between the vehicle and the user terminal; and a control unit configured to perform control of the vehicle based on the distance between the vehicle and the user terminal.

In the vehicle control device, the terminal distance recognition unit may be configured to select the second prescribed number of the second communication antennas including a first adjacent antenna that is the second communication antenna at a shortest distance from the user terminal recognized based on the first position.

In the vehicle control device, when the distance between the vehicle and the user terminal recognized by the terminal distance recognition processing executed at a prescribed timing comes to be equal to or less than a first determination distance, the terminal distance recognition unit may be configured to execute the terminal distance recognition processing at a next timing by activating a third prescribed number of the second communication antennas including the first adjacent antenna and a second adjacent antenna that is the second communication antenna closest to the first adjacent antenna.

The vehicle control device may further include a second terminal position recognition unit configured to execute second terminal position recognition processing for recognizing a second position of the user terminal with respect to the vehicle by activating a fourth prescribed number, which is more than the third prescribed number, of the second communication antennas including the first adjacent antenna and the second adjacent antenna and by performing the second wireless communication between the vehicle and the user terminal, when the distance between the vehicle and the user terminal recognized by activating the third prescribed number of the second communication antennas by the terminal distance recognition processing comes to be equal to or less than a second determination distance that is shorter than the first determination distance, in which the control unit may be configured to perform the control of the vehicle based on the second position.

The vehicle control device may further include a door open/close state recognition unit configured to recognize an open/close state of doors provided to the vehicle, in which the second terminal position recognition unit may be configured to recognize the position of the user terminal with respect to the vehicle by activating only the second communication antennas disposed inside the vehicle and by performing the second wireless communication between the vehicle and the user terminal, when the door open/close state recognition unit recognizes that all of the doors provided to the vehicle are in a closed state and the second position is inside the vehicle.

In the vehicle control device, the second terminal position recognition unit may be configured to decrease the number of the second communication antennas to be activated in the second terminal position recognition processing, when the second position recognized by activating the plurality of second communication antennas by the second terminal position recognition processing does not change by an amount equal to or more than a prescribed moving amount throughout a prescribed time or longer.

In the vehicle control device, the second terminal position recognition unit may be configured to change the number of the second communication antennas to be activated in the second terminal position recognition processing in accordance with the second position, when the second position changes by an amount exceeding the prescribed moving amount from a state where the second position recognized by the second terminal position recognition processing does not change by an amount equal to or more than the prescribed moving amount throughout the prescribed time or longer.

In the vehicle control device, the second terminal position recognition unit may be configured, while executing the second terminal position recognition processing for one user terminal, not to execute the second terminal position recognition processing for another user terminal.

As a second mode for achieving the foregoing object, there is a vehicle control method executed by a computer, the vehicle control method including: a first wireless communication establishment recognition step of recognizing that first wireless communication is established between a user terminal and a vehicle, the user terminal being used by a user of the vehicle and performing the first wireless communication by a first communication specification and second wireless communication by a second communication specification with the vehicle; a first terminal position recognition step of recognizing a first position of the user terminal with respect to the vehicle by activating, among a plurality of second communication antennas of the second communication specification provided to the vehicle, a first prescribed number of a plurality of the second communication antennas and by performing the second wireless communication between the vehicle and the user terminal, when the first wireless communication establishment recognition step recognizes that the first wireless communication is established between the vehicle and the user terminal; a terminal distance recognition step of: selecting a second prescribed number, which is less than the first prescribed number, of the second communication antennas based on the first position, activating the selected second communication antennas, and performing the second wireless communication between the vehicle and the user terminal to recognize a distance between the vehicle and the user terminal; and, thereafter, repeatedly executing terminal distance recognition processing for recognizing the distance between the vehicle and the user terminal by changing the number of the second communication antennas to be activated in accordance with the distance between the vehicle and the user terminal; and a control step of performing control of the vehicle based on the distance between the vehicle and the user terminal.

According to the vehicle control device, it is possible to reduce the power consumption required for recognizing the position of the user terminal.

DETAILED DESCRIPTION OF THE PREFERRED EMBODIMENTS

Figure 1:
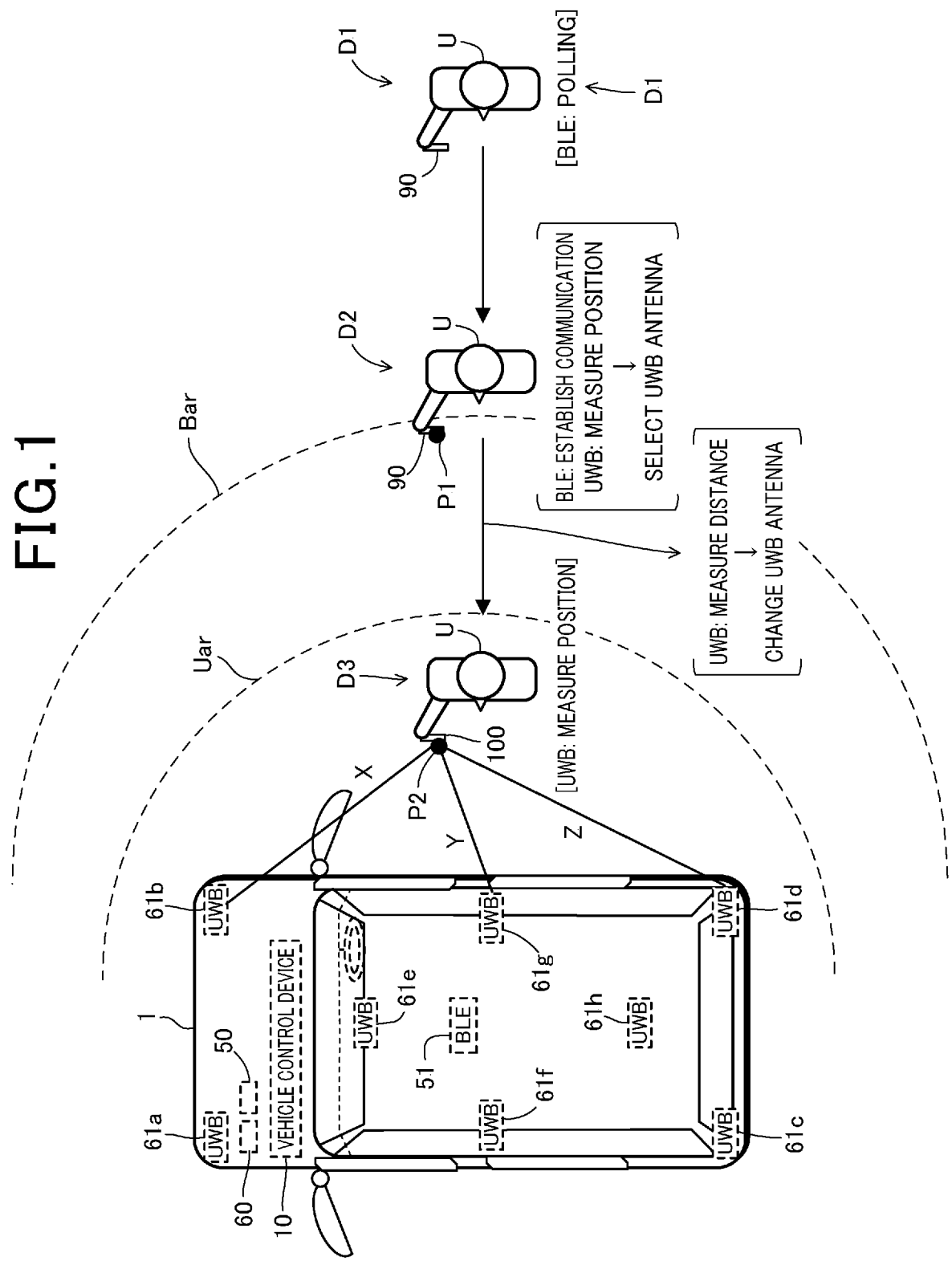
FIG. 1 is an explanatory diagram of a mode for measuring positions and distances of a user terminal with respect to a vehicle.

1. Measurement Processing of Position and Distance of User Terminal with Respect to Vehicle Referring to FIG. 1, described is measurement processing of the position and the distance of a user terminal 90 with respect to a vehicle 1, which is executed by performing wireless communication between the vehicle 1 on which a vehicle control device 10 is loaded and the user terminal 90 held by a user U of the vehicle 1.

The vehicle 1 includes a first communication unit 50 that performs wireless communication by BLE (Bluetooth Low Energy; Bluetooth is a registered trademark), and a second communication unit 60 that performs wireless communication by UWB (Ultra Wide Band). As for the UWB communication, the bandwidth of 500 MHz to a dozen GHz (for example, around 8 GHz band) is used.

The communication specification of the BLE corresponds to a first communication specification of the present disclosure, and wireless communication by the BLE (referred to as BLE communication hereinafter) corresponds to first wireless communication of the present disclosure. The communication specification of the UWB corresponds to a second communication specification of the present disclosure, and wireless communication by the UWB (referred to as UWB communication hereinafter) corresponds to second wireless communication of the present disclosure.

The user terminal 90 is a wearable device such as a smartphone, a mobile phone, a tablet terminal, or a smartwatch, for example, and it is used by being carried or worn by the user U. An electronic key application (application program) for remotely operating the vehicle 1 is installed in the user terminal 90, and the user terminal 90 functions as an electronic key having a remote operation function of the vehicle 1 by executing the electronic key application.

The vehicle 1 includes a BLE antenna 51 connected to the first communication unit 50. Furthermore, the vehicle 1 includes UWB antennas 61*a*, 61*b*, 61*c*, 61*d*, 61*e*, 61*f*, 61*g*, and 61h connected to the second communication unit 60. The UWB antennas 61a, 61b, 61c, and 61d are disposed at four corners (left front end, right front end, left rear end, and right rear end) on the outer side of the vehicle 1. The UWB antennas 61e, 61f, 61g, and 61h are disposed at the front, rear, right, and left on the inner side of the vehicle 1.

The vehicle control device 10 controls the first communication unit 50 to perform BLE communication polling, and establishes the BLE communication between the vehicle 1 and the user terminal 90 at a first position P1 where the user terminal 90 enters inside (state indicated by a reference sign D2) from the outside of a communication area Bar of the BLE communication by the first communication unit 50 (state indicated by a reference sign D1).

Then, the vehicle control device 10 performs authentication of the electronic key with the user terminal 90 to confirm that the user terminal 90 is registered as an electronic key of the vehicle 1. Specifically, the vehicle control device 10 performs collation of an authentication code transmitted from the user terminal 90 with an authentication code saved in a memory of the vehicle control device 10 to authenticate that the user terminal 90 is registered as the electronic key of the vehicle 1.

When authenticated that the user terminal 90 is registered as the electronic key of the vehicle 1, the vehicle control device 10 performs UWB communication between the vehicle 1 and the user terminal 90 via the second communication unit 60 to recognize the position and the distance of the user terminal 90 with respect to the vehicle 1. The vehicle control device 10 measures the distances between each of the UWB antennas 61a to 61h and the user terminal 90 based on ToF (Time of Flight).

At the first position P1 where the BLE communication between the vehicle 1 and the user terminal 90 is established, the vehicle control device 10 activates all of the UWB antennas 61a to 61h to perform the UWB communication between the vehicle 1 and the user terminal 90. Then, the distances between each of the UWB antennas 61a to 61h and the user terminal 90 are measured so as to recognize the position of the user terminal 90 with respect to the vehicle 1. FIG. 1 illustrates the state where the user U approaches the vehicle 1 from the right side of the vehicle 1. The vehicle control device 10 selects the UWB antenna 61g closest to the user terminal 90, and starts terminal distance recognition processing for recognizing the distance between the vehicle 1 and the user terminal 90.

The vehicle control device 10 first performs the UWB communication by activating only the UWB antenna 61g to recognize the distance between the vehicle 1 and the user terminal 90. Then, as the distance between the vehicle 1 and the user terminal 90 becomes shorter, the number of UWB antennas is increased to execute the terminal distance recognition processing. As described, by limiting the number of the UWB antennas to be activated in accordance with the distance between the vehicle 1 and the user terminal 90, it is possible to reduce the power consumption of the terminal distance recognition processing.

The vehicle control device 10 performs the UWB communication by activating the UWB antennas 61b, 61g, and 61d at a second position P2 where the distance between the vehicle 1 and the user terminal 90 becomes equal to or less than a prescribed determination distance to measure distances X, Y, and Z between the UWB antennas 61b, 61g, 61d and the user terminal 90. Since the positions of the UWB antennas 61a to 61h in the vehicle 1 are known so that, by measuring X, Y, and Z, the vehicle control device 10 can recognize P2 of the user terminal 90 with respect to the vehicle 1 with high precision by triangulation.

The vehicle control device 10 executes entry processing for the vehicle 1 based on the position of the user terminal 90 with respect to the vehicle 1. As the entry processing, the vehicle control device 10 performs lighting up of a welcome light 73 (see FIG. 2) provided to the vehicle 1, unlocking of the doors of the vehicle 1 by a door lock mechanism 72 (see FIG. 2) of the vehicle 1, and the like. Furthermore, when recognized that the user terminal 90 is positioned inside the vehicle 1, the vehicle control device 10 allows the user U to perform a power-on operation and the like.

2. Configuration of Vehicle Control Device

Figure 2:
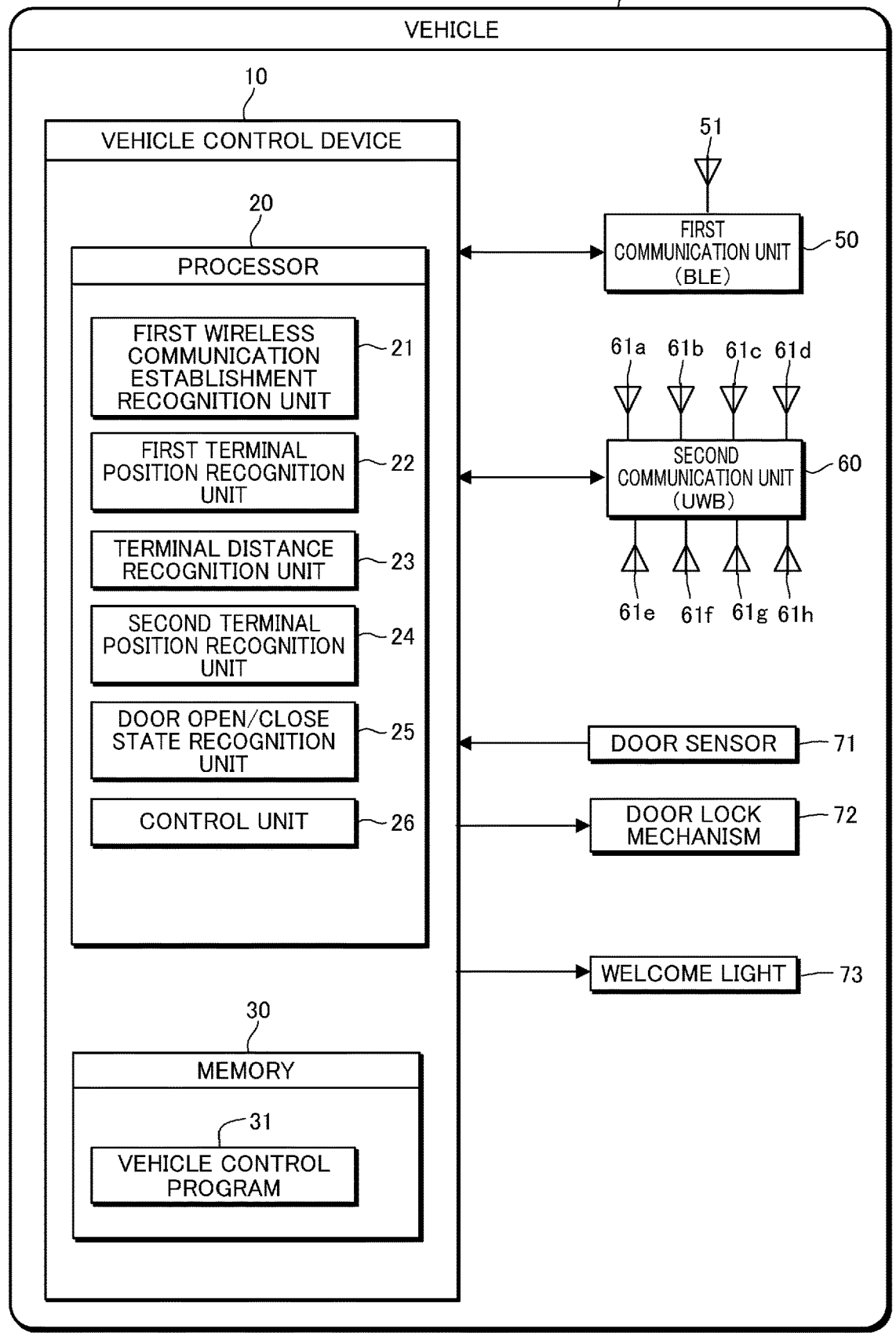
FIG. 2 is a block diagram of a vehicle on which a vehicle control device is loaded.

Referring to FIG. 2, the configuration of the vehicle control device 10 will be described. The vehicle control device 10 performs the BLE communication with the user terminal 90 via the first communication unit 50, and performs the UWB communication with the user terminal 90 via the second communication unit 60. To the vehicle control device 10, detection signals of a door sensor 71 that detects the open-close state of each of the doors of the vehicle 1 are input. With control signals output from the vehicle control device 10, operations of the door lock mechanism 72 that performs locking and unlocking of each of the doors of the vehicle 1 and the welcome light 73 are controlled.

The vehicle control device 10 is a control unit configured with a processor 20, a memory 30, an interface circuit and the like not illustrated. The processor 20 corresponds to a computer of the present disclosure. The processor 20 functions as a first wireless communication establishment recognition unit 21, a first terminal position recognition unit 22, a terminal distance recognition unit 23, a second terminal position recognition unit 24, a door open/close state recognition unit 25, and a control unit 26 by reading and executing a control program 31 saved in the memory 30. The processing executed by the first wireless communication establishment recognition unit 21, the first terminal position recognition unit 22, the terminal distance recognition unit 23, the second terminal position recognition unit 24, the door open/close state recognition unit 25, and the control unit 26 will be described later.

The processing executed by the first wireless communication establishment recognition unit 21 corresponds to a first wireless communication establishment recognition step of a vehicle control method of the present disclosure, and the processing executed by the first terminal position recognition unit 22 corresponds to a first terminal position recognition step of the vehicle control method of the present disclosure. The processing executed by the terminal distance recognition unit 23 corresponds to a terminal distance recognition step of the vehicle control method of the present disclosure, and the processing executed by the second terminal position recognition unit 24 corresponds to a second terminal position recognition step of the vehicle control method of the present disclosure. The processing executed by the control unit 26 corresponds to a control step of the vehicle control method of the present disclosure.

3. Recognition of Position and Distance of User Terminal

By referring to communication modes of the vehicle 1 and the user terminal 90 illustrated in FIG. 5 to FIG. 6, recognition processing of the position and distance of the user terminal 90 with respect to the vehicle 1, which is executed by the vehicle control device 10, will be described according to flowcharts illustrated in FIG. 3 to FIG. 4.

Figure 3:
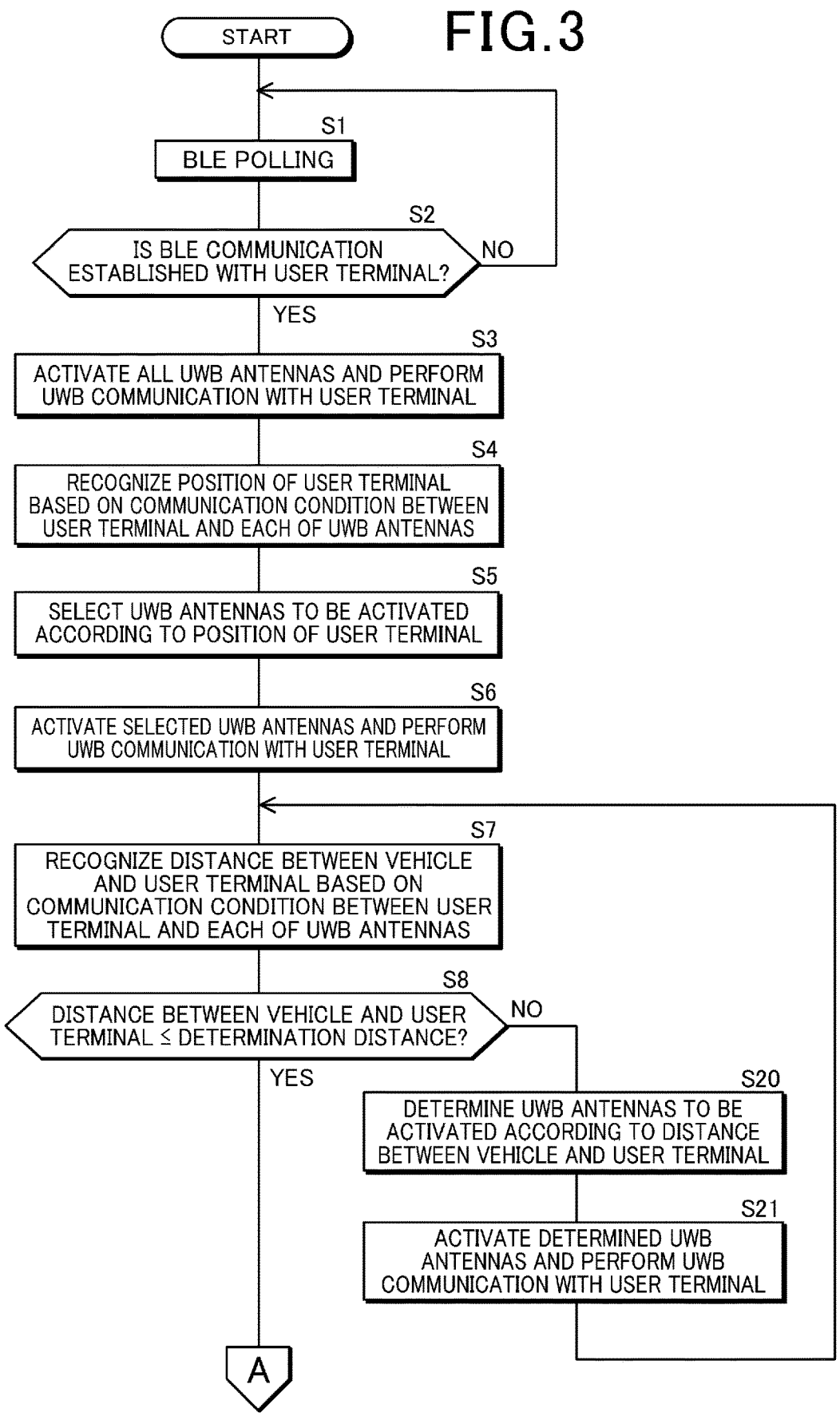
FIG. 3 is a first flowchart of processing for recognizing the position and the distance of the user terminal with respect to the vehicle.

Steps S1 to S2 of FIG. 3 are the processing executed by the first wireless communication establishment recognition unit 21. The first wireless communication establishment recognition unit 21 performs the BLE communication polling in step S1, and determines whether the BLE communication is established between the vehicle 1 and the user terminal 90 in step S2. The first wireless communication establishment recognition unit 21 shifts the processing to step S3 when the BLE wireless communication is established between the vehicle 1 and the user terminal 90, and shifts the processing to step S1 when the BLE wireless communication is not established between the vehicle 1 and the user terminal 90.

The following steps S3 to S4 are the processing executed by the first terminal position recognition unit 22. In step S3, the first terminal position recognition unit 22 activates all of the UWB antennas 61a to 61h of the vehicle 1 as illustrated in C1 of FIG. 5 and performs the UWB communication with the user terminal 90. In the next step S4, the first terminal position recognition unit 22 recognizes the position (corresponding to a first position of the present disclosure) of the user terminal 90 with respect to the vehicle 1 based on the distance between the user terminal 90 and each of the UWB antennas 61a to 61h measured by the UWB communication. Note here that the number (eight herein) of the UWB antennas activated in step S3 corresponds to a first prescribed number of the present disclosure.

The following steps S5 to S8 and steps S20 to S21 are the processing executed by the terminal distance recognition unit 23. In step S5, as illustrated in C2 of FIG. 5, the terminal distance recognition unit 23 selects the UWB antennas to be activated for recognizing the distance between the vehicle 1 and the user terminal 90 in accordance with the position of the user terminal 90.

Figure 5:
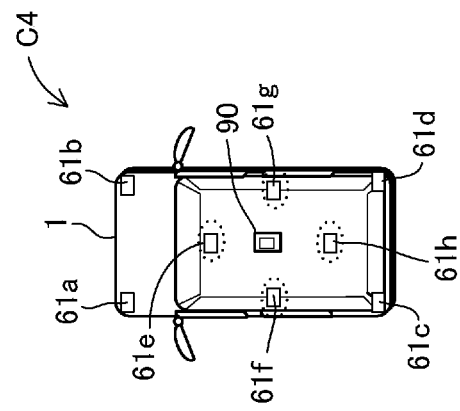
FIG. 5 is an explanatory diagram of a mode for changing UWB antennas to be activated in accordance with the position of the user terminal with respect to the vehicle.
Figure 5:
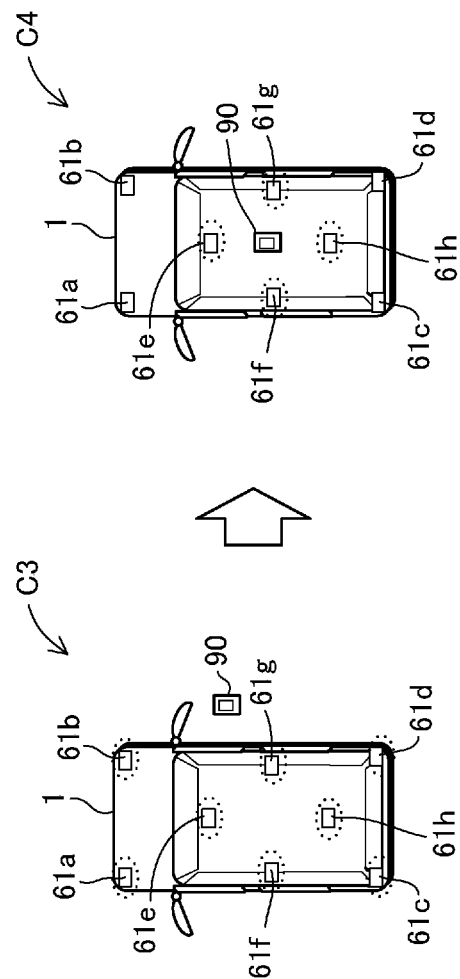
Figure 5:
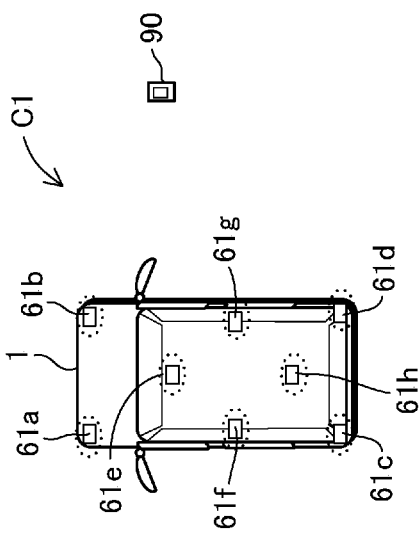
Figure 5:
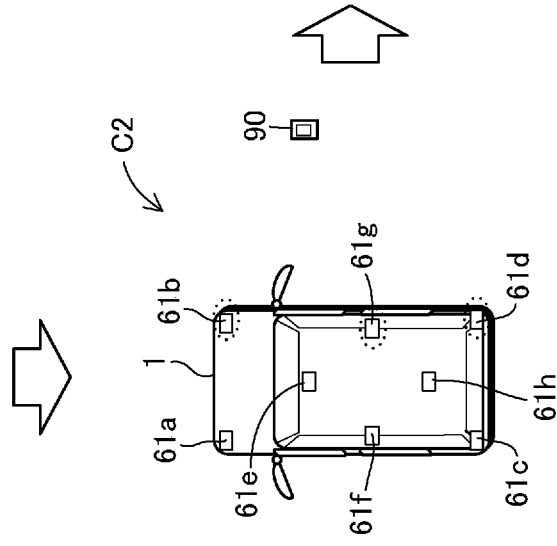

The user terminal 90 is positioned on the right side of the vehicle 1 in C2 of FIG. 5, so that the terminal distance recognition unit 23 selects the UWB antennas 61b, 61g, and 61d disposed on the right side of the vehicle 1 as the UWB antennas to be activated. Note here that the number (three herein) of the UWB antennas selected in step S5 corresponds to a second prescribed number of the present disclosure. In the following step S6, the terminal distance recognition unit 23 activates the selected UWB antennas 61b, 61g, and 61d and performs the UWB communication between the vehicle 1 and the user terminal 90.

In the next step S7, the terminal distance recognition unit 23 recognizes the distance between the vehicle 1 and the user terminal 90 based on the communication condition between the user terminal 90 and each of the activated UWB antennas (the terminal distance recognition processing). In the following step S8, the terminal distance recognition unit 23 determines whether the distance between the vehicle 1 and the user terminal 90 is equal to or less than the determination distance.

Figure 4:
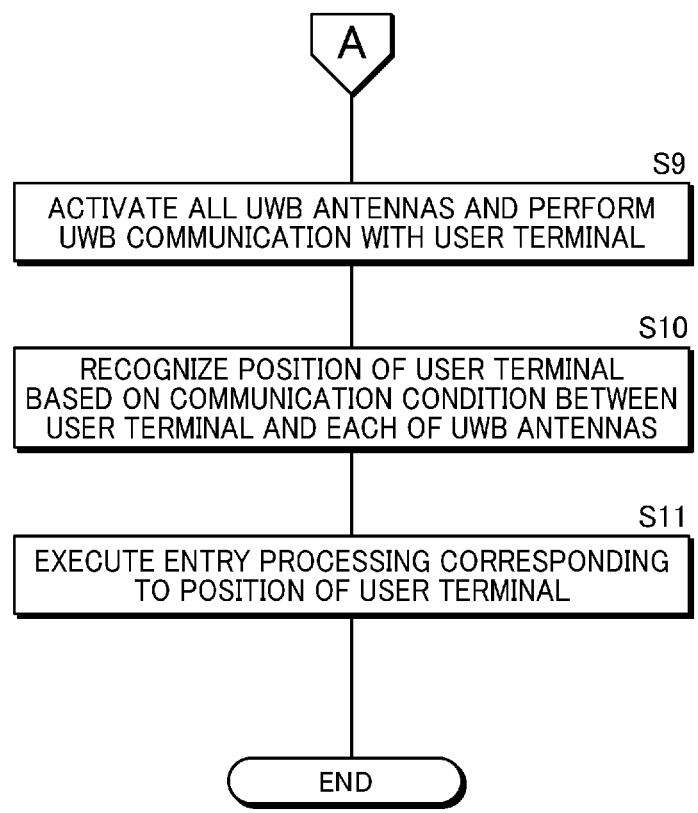
FIG. 4 is a second flowchart of the processing for recognizing the position and the distance of the user terminal with respect to the vehicle.

Then, the terminal distance recognition unit 23 shifts the processing to step S9 of FIG. 4 when the distance between the vehicle 1 and the user terminal 90 is equal to or less than the determination distance, and shifts the processing to step S20 when the distance between the vehicle 1 and the user terminal 90 exceeds the determination distance. In step S20, the terminal distance recognition unit 23 determines the UWB antennas to be activated in accordance with the distance between the vehicle 1 and the user terminal 90.

Here, referring to FIG. 6, a mode for changing the number of the UWB antennas to be activated according to the distance between the vehicle 1 and the user terminal 90 by the terminal distance recognition unit 23 will be described. Note that C5 of FIG. 6 is a case where the distance between the vehicle 1 and the user terminal 90 exceeds a first prescribed determination distance. In this case, the terminal distance recognition unit 23 activates only the UWB antenna 61d (corresponding to a first adjacent antenna of the present disclosure) closest to the user terminal 90, and executes the terminal distance recognition processing.

Figure 6:
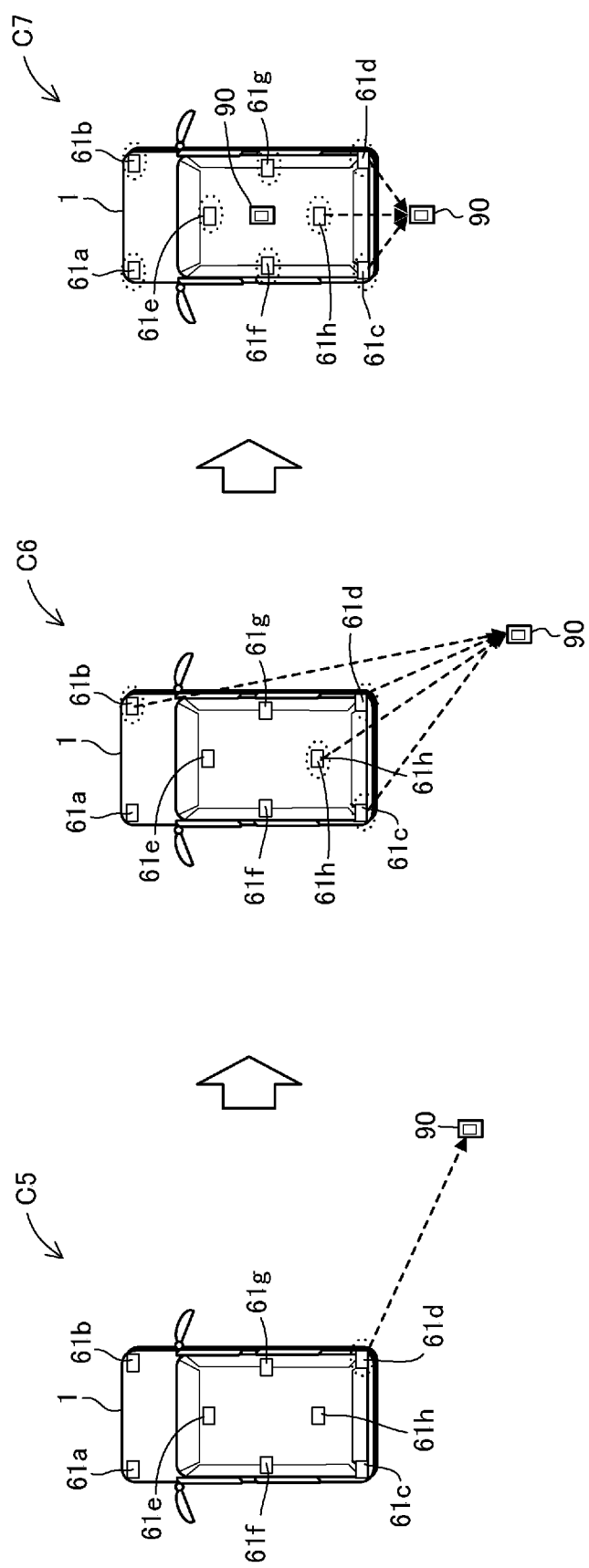
FIG. 6 is an explanatory diagram of a mode for changing the UWB antennas to be activated in accordance with the distance between the vehicle and the user terminal.

Note that C6 of FIG. 6 indicates a state where the user terminal 90 approaches the vehicle 1 so that the distance between the vehicle 1 and the user terminal 90 comes to be equal to or less than the first determination distance. In this case, the terminal distance recognition unit 23 activates the UWB antennas 61b, 61h, 61c, and 61d including the UWB antenna 61h (corresponding to a second adjacent antenna of the present disclosure) at the shortest distance from the UWB antenna 61d, and executes the terminal distance recognition processing. Note here that the number (four herein) of the UWB antennas activated by the terminal distance recognition unit 23 corresponds to a third prescribed number of the present disclosure.

Steps S9 to S10 of FIG. 4 are the processing (second terminal position recognition processing) executed by the second terminal position recognition unit 24. As illustrated in C3 of FIG. 5 and C7 of FIG. 6, the second terminal position recognition unit 24 activates all of the UWB antennas 61a to 61h and performs the UWB communication between the vehicle 1 and the user terminal 90 in step S9. In the next step S10, the second terminal position recognition unit 24 recognizes the position of the user terminal 90 based on the communication condition between the user terminal 90 and each of the UWB antennas 61a to 61h. Note here that the number (eight herein) of the UWB antennas activated in step S9 corresponds to a fourth prescribed number of the present disclosure.

When recognized that the user terminal 90 is positioned inside the vehicle 1 and the door open/close state recognition unit 25 recognizes that all of the doors provided to the vehicle 1 are in a closed state, the second terminal position recognition unit 24 activates only the UWB antennas 61e, 61f, 61g, and 61h disposed inside the vehicle 1 as illustrated in C4 of FIG. 5. Then, the second terminal position recognition unit 24 performs the UWB communication between the vehicle 1 and the user terminal 90 so as to recognize the position of the user terminal 90.

Furthermore, as illustrated in C7 of FIG. 6, the second terminal position recognition unit 24 recognizes the position of the user terminal 90 that has approached the vehicle 1 by recognizing the distance between the vehicle 1 and the user terminal 90 through triangulation by activating the UWB antennas 61c, 61f, and 61h closest to the user terminal 90.

In the following step S11, the control unit 26 executes the entry processing for the vehicle 1 based on the position of the user terminal 90. As the entry processing, the control unit 26 performs lighting up of the welcome light 73 (see FIG. 2) and unlocking of the doors of the vehicle 1 by the door lock mechanism 72. In a case where the vehicle 1 has power doors, the control unit 26 may perform control for opening the power doors as the entry processing. When the position of the user terminal 90 recognized by the second terminal position recognition unit 24 is inside the vehicle 1, the control unit 26 receives an operation of a power switch (not illustrated) of the vehicle 1.

4. Another Embodiment

While all of the UWB antennas 61*a* to 61*h* are activated in step S3 of FIG. 3 in the embodiment described above, only the UWB antennas 61*a*, 61*b*, 61*c*, and 61*d* disposed at the four corners of the vehicle 1 may be activated. In that case, the number of the UWB antennas 61*a*, 61*b*, 61*c*, and 61*d* corresponds to the first prescribed number of the present disclosure.

In that case, in step S4, the first terminal position recognition unit 22 recognizes the position of the user terminal 90 with respect to the vehicle 1 in accordance with the condition of the UWB communication between the UWB antennas 61*a*, 61*b*, 61*c*, and 61*d* disposed at the four corners and the user terminal 90.

In the embodiment described above, the second terminal position recognition unit 24 activates all of the UWB antennas 61*a* to 61*h* in step S9 of FIG. 4. However, as illustrated in C7 of FIG. 6, for example, only the three UWB antennas 61*c*, 61*d*, and 61*h* close to the user terminal 90 may be activated to recognize the position of the user terminal 90.

In the embodiment described above, the second terminal position recognition unit 24 may decrease the number of the UWB antennas to be activated in the second terminal position recognition processing, when the position of the user terminal 90 recognized by the second terminal position recognition processing does not change by an amount equal to or more than a prescribed moving amount throughout a prescribed time or longer. Furthermore, the second terminal position recognition unit 24 may change the number of the UWB antennas to be activated in the second terminal position recognition processing according to the changed position of the user terminal 90, when the position of the user terminal 90 changes by an amount exceeding the prescribed moving amount from the state where the position of the user terminal 90 recognized by the second terminal position recognition processing does not change by an amount equal to or more than the prescribed moving amount throughout the prescribed time or longer.

In the embodiment described above, the second terminal position recognition unit 24 may be configured, while executing the second terminal position recognition processing regarding a single user terminal 90, not to execute the second terminal position processing for another user terminal.

Note that FIG. 1 and FIG. 2 are schematic diagrams illustrating the configurations of the vehicle 1 and the vehicle control device 10 sectioned in blocks according to the main processing content thereof for facilitating understanding of the invention of the present application, but the configuration of the vehicle control device 10 may be sectioned in a different manner. Furthermore, the processing of each of the structural components may be executed by a single hardware unit or by a plurality of hardware units. Moreover, the processing by each of the structural components illustrated in FIG. 3 to FIG. 4 may be executed by a single program or a plurality of programs.

5. Configurations Supported by the Embodiments

The embodiments described above are specific examples of the following configurations.

(Item 1) A vehicle control device including: a first wireless communication establishment recognition unit configured to recognize that first wireless communication is established between a user terminal and a vehicle, the user terminal being used by a user of the vehicle and performing the first wireless communication by a first communication specification and second wireless communication by a second communication specification with the vehicle; a first terminal position recognition unit configured to recognize a first position of the user terminal with respect to the vehicle by activating, among a plurality of second communication antennas of the second communication specification provided to the vehicle, a first prescribed number of a plurality of the second communication antennas and by performing the second wireless communication between the vehicle and the user terminal, when the first wireless communication establishment recognition unit recognizes that the first wireless communication is established between the vehicle and the user terminal; a terminal distance recognition unit configured to: select a second prescribed number, which is less than the first prescribed number, of the second communication antennas based on the first position, activate the selected second communication antennas, and perform the second wireless communication between the vehicle and the user terminal to recognize a distance between the vehicle and the user terminal; and, thereafter, repeatedly execute terminal distance recognition processing for recognizing the distance between the vehicle and the user terminal by changing the number of the second communication antennas to be activated in accordance with the distance between the vehicle and the user terminal; and a control unit configured to perform control of the vehicle based on the distance between the vehicle and the user terminal.

According to the vehicle control device of item 1, it is possible to reduce the power consumption required for recognizing the position of the user terminal that approaches the vehicle.

(Item 2) The vehicle control device according to item 1, in which the terminal distance recognition unit selects the second prescribed number of the second communication antennas including a first adjacent antenna that is the second communication antenna at a shortest distance from the user terminal recognized based on the first position.

According to the vehicle control device of item 2, it is possible to increase the recognition precision of the distance between the vehicle and the user terminal by activating the first adjacent antenna that is closest to the user terminal so that the communication conditions of the second wireless communication thereof is the optimal.

(Item 3) The vehicle control device according to item 2, in which, when the distance between the vehicle and the user terminal recognized by the terminal distance recognition processing executed at a prescribed timing comes to be equal to or less than a first determination distance, the terminal distance recognition unit executes the terminal distance recognition processing at a next timing by activating a third prescribed number of the second communication antennas including the first adjacent antenna and a second adjacent antenna that is the second communication antenna closest to the first adjacent antenna.

According to the vehicle control device of item 3, it is possible to improve the recognition precision of the distance between the vehicle and the user terminal by activating the first adjacent antenna and the second adjacent antenna in combination.

(Item 4) The vehicle control device according to item 3, further including a second terminal position recognition unit configured to execute second terminal position recognition processing for recognizing a second position of the user terminal with respect to the vehicle by activating a fourth prescribed number, which is more than the third prescribed number, of the second communication antennas including the first adjacent antenna and the second adjacent antenna and by performing the second wireless communication between the vehicle and the user terminal, when the distance between the vehicle and the user terminal recognized by activating the third prescribed number of the second communication antennas by the terminal distance recognition processing comes to be equal to or less than a second determination distance that is shorter than the first determination distance, in which the control unit performs the control of the vehicle based on the second position.

According to the vehicle control device of item 4, it is possible to recognize the position of the user terminal with respect to the vehicle with high precision by increasing the second communication antennas to be activated when the user terminal approaches still closer to the vehicle.

(Item 5) The vehicle control device according to item 4, further including a door open/close state recognition unit configured to recognize an open/close state of doors provided to the vehicle, in which the second terminal position recognition unit recognizes the position of the user terminal with respect to the vehicle by activating only the second communication antennas disposed inside the vehicle and by performing the second wireless communication between the vehicle and the user terminal, when the door open/close state recognition unit recognizes that all of the doors provided to the vehicle are in a closed state and the second position is inside the vehicle.

According to the vehicle control device of item 5, it is possible to recognize the position of the user terminal efficiently by activating only the second communication antennas disposed inside the vehicle when the user terminal is positioned inside the vehicle.

(Item 6) The vehicle control device according to item 4 or 5, in which the second terminal position recognition unit decreases the number of the second communication antennas to be activated in the second terminal position recognition processing, when the second position recognized by activating the plurality of second communication antennas by the second terminal position recognition processing does not change by an amount equal to or more than a prescribed moving amount throughout a prescribed time or longer.

According to the vehicle control device of item 6, it is possible to reduce the power consumption of the second terminal position recognition processing by decreasing the number of the second communication antennas to be activated, when it is assumed to be unlikely that the user is to use the vehicle since the position of the user terminal hardly changes.

(Item 7) The vehicle control device according to item 6, in which the second terminal position recognition unit changes the number of the second communication antennas to be activated in the second terminal position recognition processing in accordance with the second position, when the second position changes by an amount exceeding the prescribed moving amount from a state where the second position recognized by the second terminal position recognition processing does not change by an amount equal to or more than the prescribed moving amount throughout the prescribed time or longer.

According to the vehicle control device of item 7, it is possible to suppress the waste of power to be consumed by activating only the necessary second communication antennas by changing the number of the second communication antennas to be activated, when it is estimated that the user approaches or leaves from the vehicle since the moving amount of the user terminal is increased.

(Item 8) The vehicle control device according to any one of items 4 to 7, in which, while executing the second terminal position recognition processing for one user terminal, the second terminal position recognition unit does not execute the second terminal position recognition processing for another user terminal.

According to the vehicle control device of item 8, it is possible to avoid increase of the power consumption due to the second terminal position recognition processing by executing the second terminal position recognition processing individually for the user terminal held by each user, when a plurality of users approach the vehicle.

(Item 9) A vehicle control method executed by a computer, the vehicle control method including: a first wireless communication establishment recognition step of recognizing that first wireless communication is established between a user terminal and a vehicle, the user terminal being used by a user of the vehicle and performing the first wireless communication by a first communication specification and second wireless communication by a second communication specification with the vehicle; a first terminal position recognition step of recognizing a first position of the user terminal with respect to the vehicle by activating, among a plurality of second communication antennas of the second communication specification provided to the vehicle, a first prescribed number of a plurality of the second communication antennas and by performing the second wireless communication between the vehicle and the user terminal, when the first wireless communication establishment recognition step recognizes that the first wireless communication is established between the vehicle and the user terminal; a terminal distance recognition step of: selecting a second prescribed number, which is less than the first prescribed number, of the second communication antennas based on the first position, activating the selected second communication antennas, and performing the second wireless communication between the vehicle and the user terminal to recognize a distance between the vehicle and the user terminal; and, thereafter, repeatedly executing terminal distance recognition processing for recognizing the distance between the vehicle and the user terminal by changing the number of the second communication antennas to be activated in accordance with the distance between the vehicle and the user terminal; and a control step of performing control of the vehicle based on the distance between the vehicle and the user terminal.

By executing the vehicle control method of item 9 with the computer, it is possible to achieve the same effects as those of the vehicle control device of item 1.

REFERENCE SIGNS LIST

1 . . . Vehicle, 10 . . . Vehicle control device, 20 . . . Processor, 21 . . . First wireless communication establishment recognition unit, 22 . . . First terminal position recognition unit, 23 . . . Terminal distance recognition unit, 24 . . . Second terminal position recognition unit, 25 . . . Door open/close state recognition unit, 26 . . . Control unit, 30 . . . Memory, 31 . . . Control program, 50 . . . First communication unit, 51 . . . BLE antenna, 60 . . . Second communication unit, 61a to 61h . . . UWB antenna, 71 . . . Door sensor, 72 . . . Door lock mechanism, 73 . . . Welcome light, 90 . . . User terminal, U . . . User

What is claimed is:

1. A vehicle control device comprising a processor that includes:
    a first wireless communication establishment recognition unit configured to recognize that first wireless communication is established between a user terminal and a vehicle, the user terminal being used by a user of the vehicle and performing the first wireless communication by a first communication specification and second wireless communication by a second communication specification with the vehicle;
    a first terminal position recognition unit configured to recognize a first position of the user terminal with respect to the vehicle by activating, among a plurality of second communication antennas of the second communication specification provided to the vehicle, a first prescribed number of a plurality of the second communication antennas and by performing the second wireless communication between the vehicle and the user terminal, when the first wireless communication establishment recognition unit recognizes that the first wireless communication is established between the vehicle and the user terminal;
    a terminal distance recognition unit configured to: select a second prescribed number, which is less than the first prescribed number, of the second communication antennas based on the first position so that the second communication antennas are divided into a group of selected second communication antennas and a group of unselected second communication antennas, activate the group of the selected second communication antennas and deactivate the group of the unselected second communication antennas, and perform the second wireless communication between the vehicle and the user terminal to recognize a distance between the vehicle and the user terminal; and, thereafter, repeatedly execute terminal distance recognition processing for recognizing the distance between the vehicle and the user terminal by changing the number of the second communication antennas to be activated in accordance with the distance between the vehicle and the user terminal; and
    a control unit configured to perform control of the vehicle based on the distance between the vehicle and the user terminal.

2. The vehicle control device according to claim 1, wherein the terminal distance recognition unit selects the second prescribed number of the second communication antennas including a first adjacent antenna that is the second communication antenna at a shortest distance from the user terminal recognized based on the first position.

3. The vehicle control device according to claim 2, wherein, when the distance between the vehicle and the user terminal recognized by the terminal distance recognition processing executed at a prescribed timing comes to be equal to or less than a first determination distance, the terminal distance recognition unit executes the terminal distance recognition processing at a next timing by activating a third prescribed number of the second communication antennas including the first adjacent antenna and a second adjacent antenna that is the second communication antenna closest to the first adjacent antenna.

4. The vehicle control device according to claim 3, wherein the processor further includes a second terminal position recognition unit configured to execute second terminal position recognition processing for recognizing a second position of the user terminal with respect to the vehicle by activating a fourth prescribed number, which is more than the third prescribed number, of the second communication antennas including the first adjacent antenna and the second adjacent antenna and by performing the second wireless communication between the vehicle and the user terminal, when the distance between the vehicle and the user terminal recognized by activating the third prescribed number of the second communication antennas by the terminal distance recognition processing comes to be equal to or less than a second determination distance that is shorter than the first determination distance, wherein
    the control unit performs the control of the vehicle based on the second position.

5. The vehicle control device according to claim 4, wherein the processor further includes a door open/close state recognition unit configured to recognize an open/close state of doors provided to the vehicle, wherein
    the second terminal position recognition unit recognizes the position of the user terminal with respect to the vehicle by activating only the second communication antennas disposed inside the vehicle and by performing the second wireless communication between the vehicle and the user terminal, when the door open/close state recognition unit recognizes that all of the doors provided to the vehicle are in a closed state and the second position is inside the vehicle.

6. The vehicle control device according to claim 4, wherein the second terminal position recognition unit decreases the number of the second communication antennas to be activated in the second terminal position recognition processing, when the second position recognized by activating the plurality of second communication antennas by the second terminal position recognition processing does not change by an amount equal to or more than a prescribed moving amount throughout a prescribed time or longer.

7. The vehicle control device according to claim 6, wherein the second terminal position recognition unit changes the number of the second communication antennas to be activated in the second terminal position recognition processing in accordance with the second position, when the second position changes by an amount exceeding the prescribed moving amount from a state where the second position recognized by the second terminal position recognition processing does not change by an amount equal to or more than the prescribed moving amount throughout the prescribed time or longer.

8. The vehicle control device according to claim 4, wherein, while executing the second terminal position recognition processing for one user terminal, the second terminal position recognition unit does not execute the second terminal position recognition processing for another user terminal.

9. A vehicle control method executed by a computer, the vehicle control method comprising:
    a first wireless communication establishment recognition step of recognizing that first wireless communication is established between a user terminal and a vehicle, the user terminal being used by a user of the vehicle and performing the first wireless communication by a first communication specification and second wireless communication by a second communication specification with the vehicle;
    a first terminal position recognition step of recognizing a first position of the user terminal with respect to the vehicle by activating, among a plurality of second communication antennas of the second communication specification provided to the vehicle, a first prescribed number of a plurality of the second communication antennas and by performing the second wireless communication between the vehicle and the user terminal, when the first wireless communication establishment recognition step recognizes that the first wireless communication is established between the vehicle and the user terminal;

a terminal distance recognition step of: selecting a second prescribed number, which is less than the first prescribed number, of the second communication antennas based on the first position so that the second communication antennas are divided into a group of selected second communication antennas and a group of unselected second communication antennas, activating the group of the selected second communication antennas and deactivate the group of the unselected second communication antennas, and performing the second wireless communication between the vehicle and the user terminal to recognize a distance between the vehicle and the user terminal; and, thereafter, repeatedly executing terminal distance recognition processing for recognizing the distance between the vehicle and the user terminal by changing the number of the second communication antennas to be activated in accordance with the distance between the vehicle and the user terminal; and a control step of performing control of the vehicle based on the distance between the vehicle and the user terminal.

* * * * *